Jan. 3, 1956 P. F. M. GLOESS 2,729,811

NUMERATION CONVERTERS

Filed Jan. 22, 1951 4 Sheets-Sheet 1

Inventor
Paul F.M. Gloess
By Ralph B. Stewart
attorney

NUMERATION CONVERTERS

Filed Jan. 22, 1951 4 Sheets-Sheet 2

Inventor
Paul F. M. Gloess
By Ralph B. Stewart
Attorney

NUMERATION CONVERTERS

Filed Jan. 22, 1951 4 Sheets-Sheet 3

Inventor
Paul F. M. Gloess
By Ralph B. Stewart
attorney

Jan. 3, 1956 P. F. M. GLOESS 2,729,811

NUMERATION CONVERTERS

Filed Jan. 22, 1951 4 Sheets-Sheet 4

Inventor
Paul F.M. Gloess
By Ralph B. Stewart
attorney

United States Patent Office 2,729,811
Patented Jan. 3, 1956

2,729,811

NUMERATION CONVERTERS

Paul François Marie Gloess, Paris, France, assignor to Societe d'Electronique et d'Automatisme, Paris, France, a corporation of France Application January 22, 1951, Serial No. 207,137
Claims priority, application France January 28, 1950
11 Claims. (Cl. 340—347)

Figure 1:
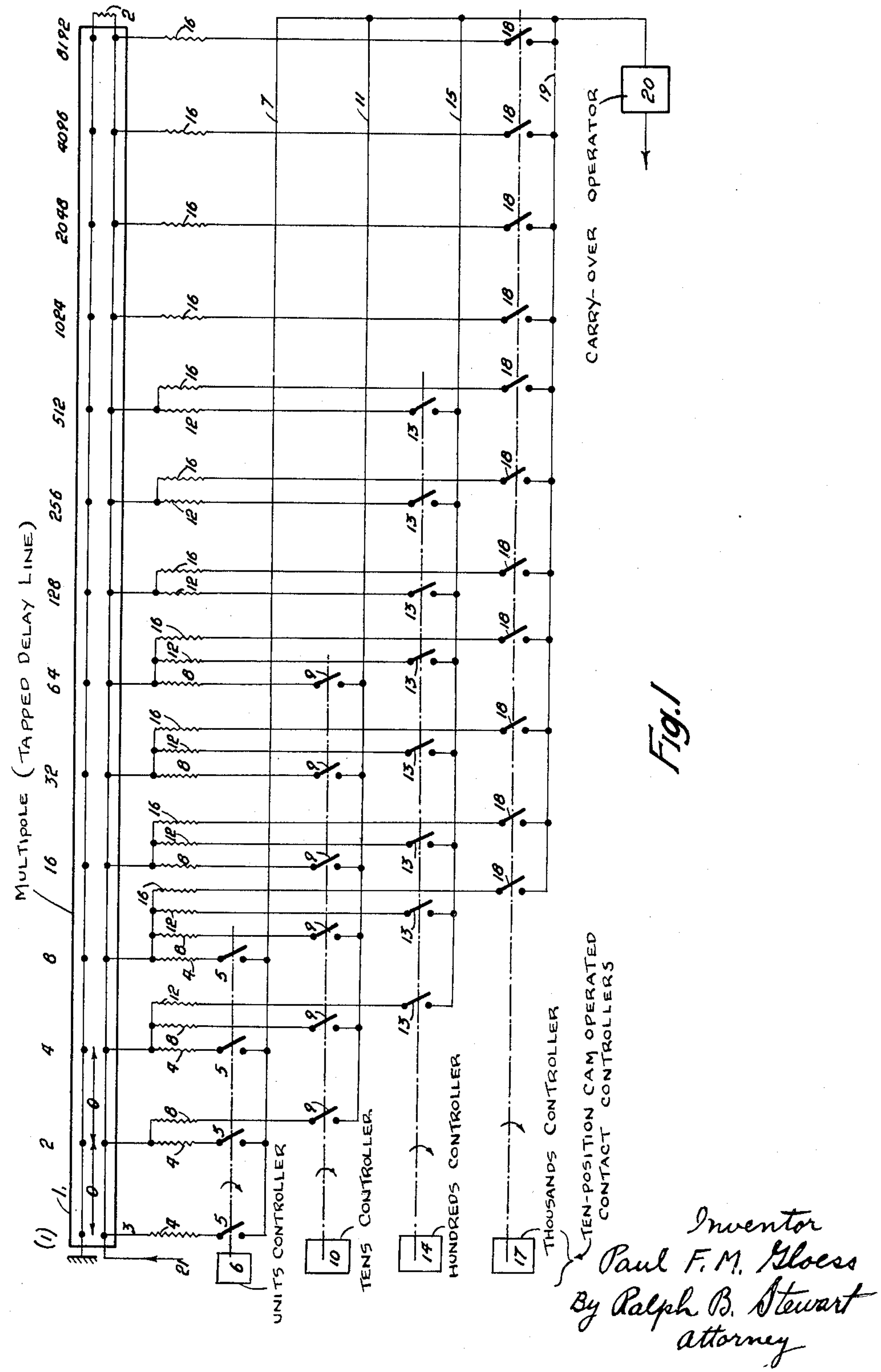

The present invention relates to numeration converters which makes it possible to convert any registration of a number representing a numerical quantity or a quantity information element, given in a numeration system of base A, into the corresponding registration in a numeration system of base B, B being of lower value than A, and more particularly of the binary numeration system in which $B=2$. "Registration" refers to any physical representation of a quantity and more especially an electrical representation of a quantity reproducing the development of the number in a particular system, such as:

$$N=a_0+a_1.A+a_2.A^2+ \dots +a_n.A^n$$

in the numeration system of base A, and:

$$N=b_0+b_1.B+b_2.B^2+ \dots b_m.B^m$$

in the numeration system of base B, the coefficients $a_0$, $a_1$, $a_2$, . . . $a_n$ being given any suitable integer values from 0 to A−1, and the coefficients $b_0$, $b_1$, $b_2$, . . . $b_m$ similarly being given any suitable integer values from 0 to B−1.

Practically and considering the most usual numeration systems, that is the decimal and binary systems, base A is taken as equal to 10, thus coefficients may be given any values from 0 to 9 and base B is taken as equal to 2, coefficients thus being given only the values 0 and 1.

As base A(10) is higher than base B(2) the number of base A, its multiples and submultiples may be registered in the form of such developments in the base B numeration system.

With reference to the electrical representation of a value, two registering methods may be considered: a first one which will be called series numeration consists in a regularly time pulse train, coded in such a manner that the amplitude levels of its pulses at instants 0, $\theta$, $2\theta$ . . . , reproduce the values of the coefficients of the above-cited developments, instants 0, $\theta$, $2\theta$ . . . , being in themselves given weights or orders 1, A, $A^2$ . . . or 1, B, $B^2$, depending upon the numeration base, and a second one which will be called parallel numeration consists in a record or display of the values of coefficients $a$ or $b$ on multi-position or multi-conductivity-condition members such as connectors, switches, potentiometers or trippers, distributed in such a succession that their locations give them the weights or orders 1, A, $A^2$, . . . or 1, B, $B^2$. Shifting from one to the other of these two registering methods is readily conceivable, as it suffices to proceed with the recording of a coded train (written in series numeration) on such an element assembly, to obtain a parallel numeration registration, and reversely, to proceed with the time reading of such a record to obtain a pulse train coded in series numeration registration.

According to the present invention, converting the registration of a number, given in a base A numeration system, into the registration of the said number in a base B numeration system (B being lower than A), is obtained by registering in parallel numeration, in the base B system, each digit of the registering of the number in the base A system, by converting this parallel numeration registration into a series numeration registration and by totalizing, according to the latter registering method, the so translated digits, with their respective weights or orders, said weights or orders being applied either prior to or during the above-mentioned totalization.

However, when putting into practice such a method, various operational processes may be adopted within the scope of the invention, each of the said operational processes leading to corresponding structure embodiments of the numeration converters.

One first operational process consists in first effecting the parallel numeration registration, in the base B numeration system, of the entire registration digits of the number, as given in the base A numeration system and thereafter its conversion into series numeration, applying to said digits their orders or weights, and, lastly to perform their totalization.

Consequently, a converter according to this operational process will essentially consist in as many registration quadripoles in parallel numeration, for registration in the base B numeration system of the values from 0 to (A−1) of each term of the development of the number in the base A system, as there are terms in the development of the maximum numerical quantity to be dealt with, the outputs of the said quadripoles being connected in multiple to the input of a totalizer circuit incorporating a carry over operator; in this case, the orders or weights are applied to the values from 0 to A−1 by said quadripoles.

In this specification and in the appended claims the term "multipole" is applied to an artificial delay line terminated in its characteristic impedance and having a number of output taps connected at spaced points along its length, the output taps being connected to a common output line through individual switches. The term "quadripole" applies to a multipole with only four output taps and switches.

A second operational process consists in effecting this same parallel numeration registration, in the base B system, of the entire registration digits of the number given in the base A system, without weights being applied, and then in progressively converting said parallel numeration registration into series numeration registration, starting with the higher order terms, by partial conversion, weight affectation and progressive totalization of the result of the preceding conversion multiplied by the value of base A registered in the base B system, and, lastly in rectifying the registration by performing the carry over operation.

A converter according to this second operational process, a modification of the first process, essentially consists in as many quadripoles for registering in parallel numeration the values from 0 to (A−1) the coefficients of each term of the development of the number in the base A system, as there are terms in the numerical development of the quantity to be dealt with, the outputs of said quadripoles being connected to a progressively totalizing circuit incorporating means to effect, at each partial totalization, both rectification of the result registration and its multiplication by the A value; such a totalizing circuit may be established either in the form of a channel of partial totalizers or/and preferably, in the form of a memory totalizer in a loop circuit.

According to a modification of this second operational process, a third process consists in performing the registration in parallel numeration and to convert into series registration in the base B system, the successive digits of the number as registered in the base A system, in the direction of decreasing orders, and to proceed, at each occurrence, to the partial totalization of the digit converted to the result of the preceding conversion (which already incorporated such a partial totalization) multiplied by the A value, a rectification by performing the carry over operation following this totalization.

A converter according to this operational process then essentially consists in a quadripole for displaying in parallel numeration the values from 0 to (A−1) of the coefficients of the terms of the development of the number in the base A system, and a memory totalizer with a loop circuit incorporating means to perform, at each partial totalization, both the rectification of the registration of the result and its multiplication by the A value.

As modification of the two latter operational processes, there may be provided an intermediary registration of the entire series numeration registrating of the coefficients of the terms of the development in the base A system, following each other, and a sequential sampling of these registrations for the above-cited progressive totalization. The converters according to the latter modification then comprise a memory loop circuit inserted between the display quadripole, or quadripoles, and the memory totalizer, in a loop circuit.

The above-mentioned and further features are to be set forth in the following detailed description of a few embodiments of totalizers, making it possible to convert a number expressed in decimal numeration in its registration into binary numeration due to the fact that the latter numeration system is able, without any expedient, to register unity.

Figure 2:
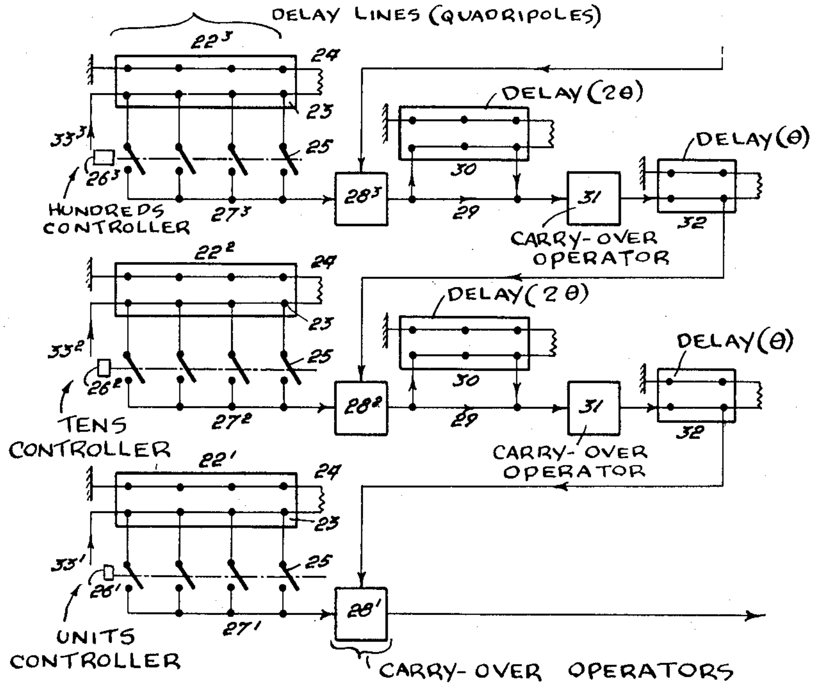
Figure 3:
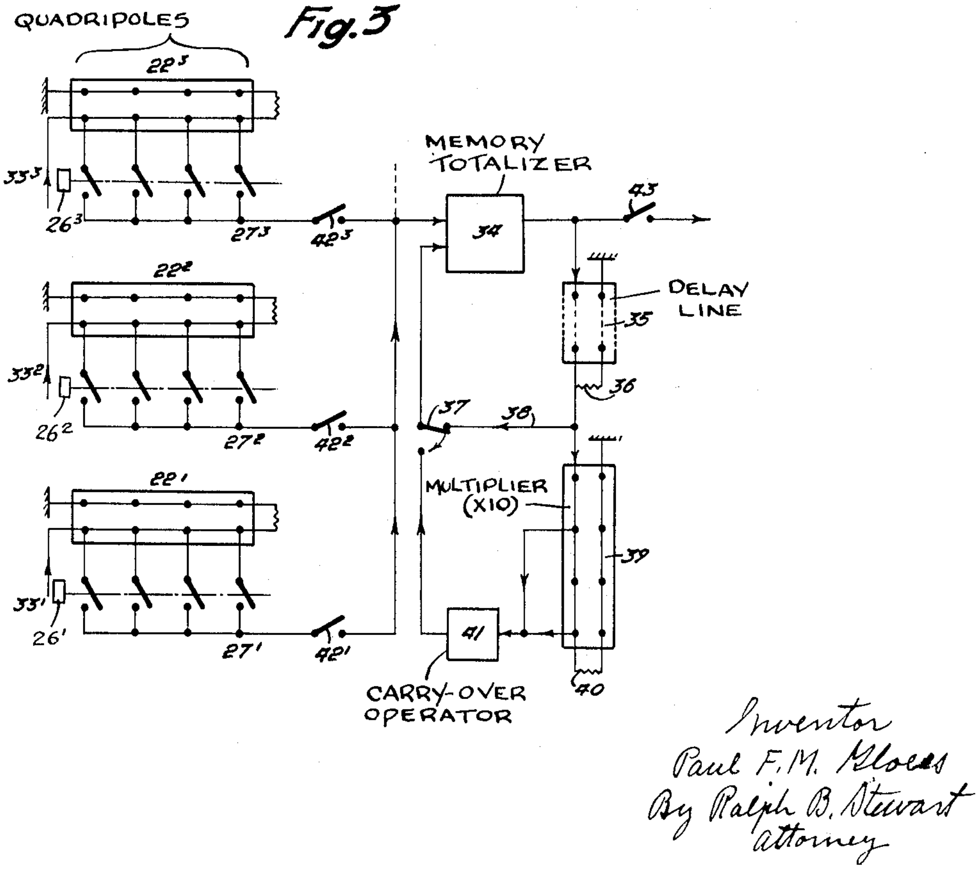
Figure 4:
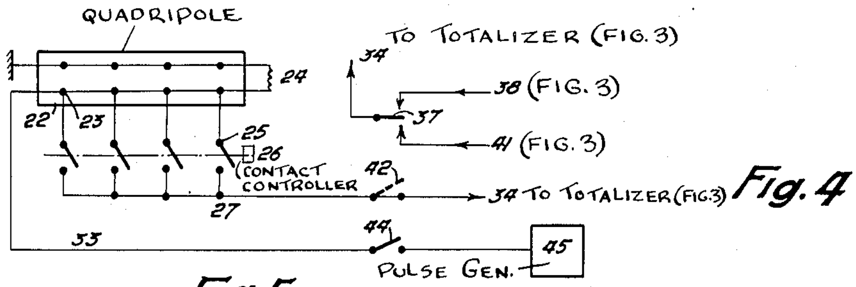
Figure 5:
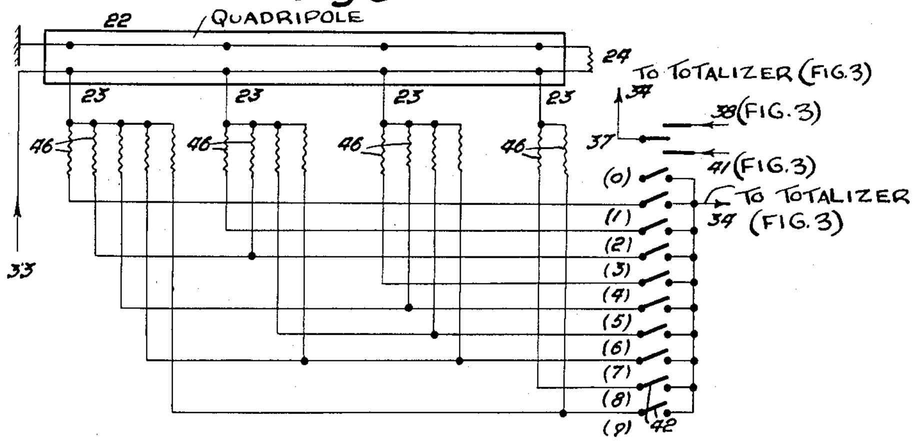
Figure 6:
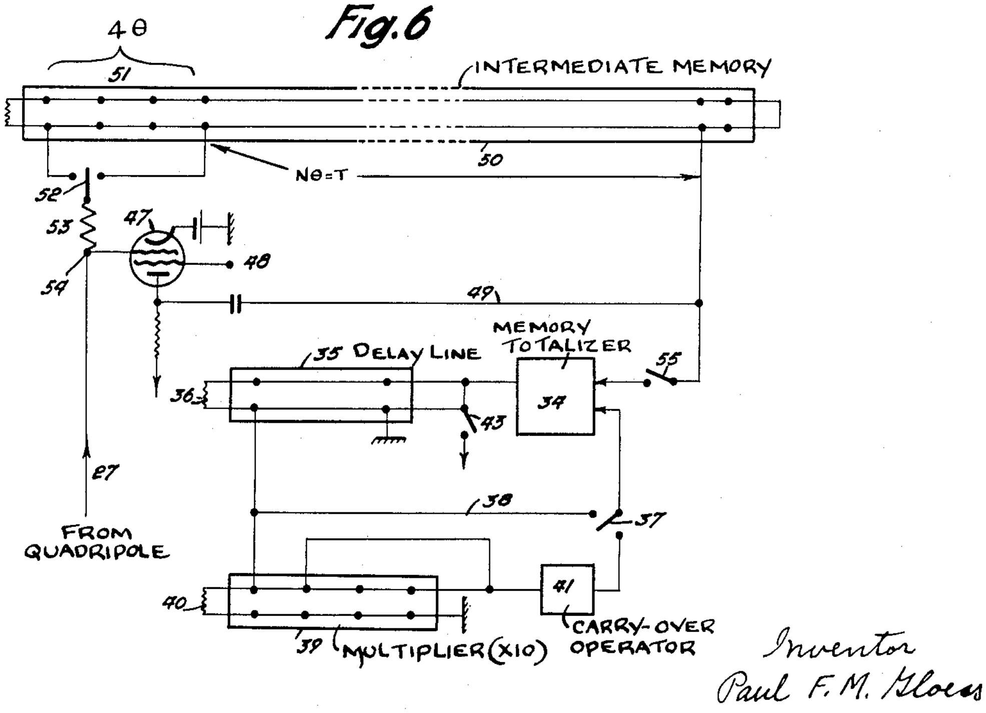
Figure 7:
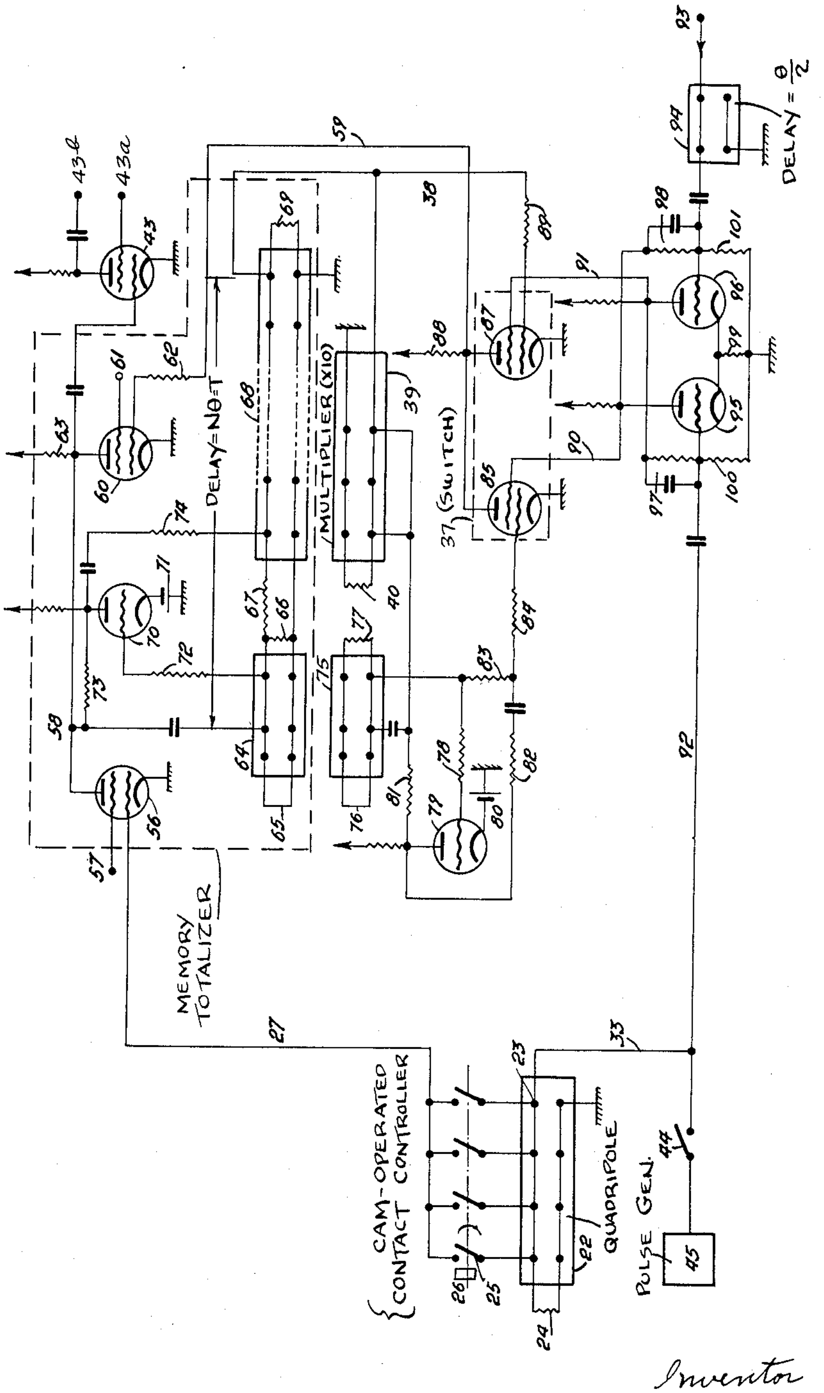

In the annexed diagrammatical drawings:

Fig. 1 shows a converter according to the first above-cited operational process, Figs. 2 and 3 show converters according to the second of the above-cited operational processes, Figs. 4 and 5 are partial representations of converters according to the third operational process, Fig. 6 shows a converter incorporating the last above-cited modification, and Fig. 7 is a more detailed electronic representation according to the third above-cited operational process.

In the diagram shown in Fig. 1, the capacity of the decimal binary converter shown, amounts to 10,000 ($10^4$) but its extension to larger capacities is obvious. It comprises a transit time multipole, such as a delaying line 1 terminated on its characteristic impedance 2, with fourteen output taps 3, equidistant in time and separated from each other by individual intervals $\theta$, $\theta$ being the desired interval between instants of the coded train carrying the series binary numeration registration to be produced.

The first four tappings of the delay line 1 are connected, via mixing resistors 4, to the contacts 5 of a mechanical or electro-mechanical combination switch 6 having ten positions for establishing different contact combinations, the tenth position, corresponding to the digit 0, being that position in which all contacts 5 are open. The drawing shows the switch 6 in purely diagrammatic form; it is assumed to have a mechanical switch-actuating-spindle common to all contacts 5 and indicated by the broken line against which the reference numeral 6 is marked. The contacts 5 are connected to a common output conductor 7.

The second to seventh taps, inclusive, of the delay line are connected via mixing resistors 8 to the contacts 9 of a second and similar combination switch 10, also having ten positions for establishing different contact combinations, the contacts 9 being connected to a common output conductor 11.

The third to tenth taps, inclusive, of the delay line are connected, via mixing resistors 12, to the contacts 13 of a third combination switch 14 likewise having ten contact positions, the contacts 13 being connected to a common output conductor 15.

The fourth to fourteenth taps, inclusive, of the delay line are connected, via mixing resistors 16, to the contacts 17 of a fourth combination switch 18 having ten contact positions, the contacts 17 being connected to a common output conductor 19.

Leads 7, 11, 15 and 19 are connected in common to a carry over operator 20. Said carry over operator may have, for example, one of the structures set forth in the U. S. Patent application Serial No. 138,792, dated January 16, 1950, now Patent No. 2,689,683, filed by same applicant for "Method and carry-over device for correcting a coded train of electric impulses."

At 21 is shown the input of delaying line 1 for the pulses supplied from a generator (not shown) for effecting the reading of the codes displayed or set-up on the controllers. If, as in the general case, such a converter is incorporated to a transmission system, computor, or the like, the timing of which is maintained by a recurrent pulse sequence, continuously transmitted and frequently called timing pulses, one of these periodic pulses will be used for the reading of the display quadripole thus formed, for instance, each first pulse occurring at the first instant of a predetermined interval T, frequently called the slow timing interval of the system.

The ten positions of controller 6 are arranged in such a manner that it can inscribe or set-up in parallel numeration, on contacts 5, values from 0 to 9; the value 0 corresponds to the opening of every contact. Likewise, the ten positions of controller 10 are provided in such a manner that it can inscribe in parallel numeration the values of the tens, from 0 to 90. The ten positions of controller 14 makes it possible to display in parallel numeration, on contacts 13, values of hundreds, from 0 to 900, and the ten positions of controller 17 likewise enable to display on contacts 18, values of thousands, from 0 to 9,000.

Each of the arrangements comprising the contacts 5 (or 9 or 13 or 18), the resistors 4 (or 8 or 12 or 16), and the associated sections of the delay line 1 may be regarded as an encoding quadripole, of which in the present case there are thus four, that including the contacts 5 for the terms of the order $10^0$ or units digits (0–9), that including the contacts 9 for the terms of the order $10^1$ or tens digits (0–90), that including the contacts 13 for the terms of the order $10^2$ or hundreds digits (0–900), and that including the contacts 18 for the terms of the order $10^3$ or thousands digits (0–9000).

If it is desired to convert any denary-scale number up to 9999 into its equivalent expression in the binary scale, each of the switches 6, 10, 14 and 17 is manually set to a position corresponding to the appropriate digit. Thus, if the units digit of the number to be converted is 1, then the corresponding position of the switch 6 will be that in which the first contact 5 is closed and the other three open, if the units digits is 2, then the second contact 5 will be closed and the others open, if the units digits is 3, the first two contacts will both be closed and the others open, if the tens digit is 1, the first and third contacts 9 will be closed and the other four contacts 9 will be open, if the tens digit is 2, the second and fourth contacts 9 will be closed and the remainder open, and so forth in a manner which ensures that there is registered upon the switches 6, 10, 14 and 17 a "static" code representing the binary-scale expression of the corresponding digit, the closed position of a contact representing the coefficient 1 of the relevant binary-scale term, whereas the open position of a contact represents that the coefficient of the relevant binary-scale term is 0.

This registration of a "static" code is then converted into a "live" code by application of a code-reading impulse to the delay line 1 at 21. As the code-reading impulse passes through the successive sections of the delay line, it will cause a coded impulse train to be produced in each of the output conductors 7, 11, 15 and 19, the impulse moments being arranged in each output conductor in the order of the successive delay line tappings, and hence spaced from each other by time intervals $\theta$, and being characterized by the presence of an impulse where a tapping is connected to a closed contact, and by the absence of an impulse where a tapping is connected to an open contact. The coded impulse train in each output conductor will then represent the binary expression of the corresponding denary digit multiplied by 10 raised to the power appropriate to that digit. For example, assume that the denary number to be converted is 236. The second and third of the contacts 5 will then be closed, and the output train in the conductor 7 will represent the binary-scale number 110 (meaning $$1\times2^2+1\times2^1+0\times2^0$$

though the impulse moments will be placed the other way round and come out as 011 since the term of the lowest order comes first) which, of course, is the binary equivalent of the denary number $6\times10^0$; the first four of the contacts 9 will be closed, so that the output train in the conductor 11 represents the binary-scale number 11110 (the 0 being on account of the fact that there is no contact connecting the first delay line tapping with the conductor 11, which is equivalent to a permanently open contact), and this is of course the binary expression of the denary number $3\times10^1$; the second, fifth-and-sixth of the contacts 13 will be closed, so that the output train in the conductor 15 represents the binary-scale number 11001000, being the binary expression of the denary number $2\times20^2$; the contacts 18 will all be open, and there will thus be no output train in the conductor 19, or if desired the conductor 19 may be considered as carrying an output train of which all impulse moments are characterised by the absence of impulses therefrom. The four output trains are mixed at the input terminal of the carry-over operator 20, and since the impulse moments of equal order or power of the different trains arrive thereat in synchronism, the trains become added together, order by order. Thus, in the above numerical example, the train resulting from the addition will represent the binary-scale number 11012220; this number contains binary digits or coefficients of value equal to the radix 2 and is therefore level-corrected in the carry-over operator 20 from which it emerges in the form of a coded impulse train representing the binary-scale number 11101100, being the expression in the binary-scale of the denary scale number 236.

Then, considering a number equal to 9,999 or less, the numeration conversion is obtained as follows: the operator displays or registers on controllers 17, 14, 10 and 6 the digits of thousands, hundreds, tens and units of this number, such display, being decimal, ensures the inscription in binary numeration of these digits. The operator then sends into delaying line 1 a reading pulse, for instance, by closing a switch (not shown) ensuring, as above-cited, that the first timing pulse appears onto lead 21. While flowing along said line (which, if desirable, may be subdivided with insertion of pulse shape regenerating tubes, according to well known means), the pulse generates four coded trains, then carrying in series binary numeration the numbers of units, tens, hundreds, and thousands. These coded trains, through leads 7, 11, 15 and 19, are mixed in the input of the carry over operator, whence the addition, order to order, of their pulses and, simultaneously, the performing of the carry over operations. A train coded according to the series binary numeration and carrying the result of the translation flows out of operator 20.

Instead of the controller, relay sets (contacts 5, 9, 13 and 18) may be utilized which are selectively actuated by dialling pulses, according to an arrangement well known per se in automatic telephony. In general, the display contacts may consist in plain mechanical contacts operated either mechanically (controllers) or electromechanically (relays), as in practice such controllers will be used as primary coders for introducing quantities into a transmitting or computing system.

In cases in which the converter is actuated by dialling pulses, for instance, a structural modification of the converter might evidently consist in an assembly of pulse counters, with binary stages, to which the pulses representing the digits of units, hundreds, etc. would be individually sent onto.

The contacts then would be electronic, consisting in tubes unblocked by said counters, in the taps of delaying line 1, serving to the general reading, as set forth, of the conditions of the counters.

With reference now to Fig. 2, which illustrates an arrangement according to the second above cited operational process, it may be seen that the converter comprises as many elementary quadripoles $22^1$, $22^2$, $22^3$, . . . as the number to be translated may have orders in the decimal numeration. For simplification in the drawing, only three of them have been shown. These quadripoles have identical structures, limited to three sections, each with a transit time $\theta$, that is with three output taps 23; each of the said quadripoles is terminaetd on its characteristic impedance 24, and is provided, on its output taps 23, with break-up contacts 25 (the decoupling resistors are omitted in these connections). Contacts 25 are, for instance, controller contacts as indicated by the mechanical axis 26, each controller embodying, under the control of the operator, one of the ten combinations displaying numbers 0 to 9 on quadripoles 22. The contacts 25 of each quadripole are connected in multiple to an output lead 27, connected to a carry over operator 28.

The output of each carry over operator 28 is connected to a multiplier circuit of such a structure that it performs the multiplication by 10 of any quantity carried by the applied train. In the diagram of Fig. 2 these multiplier circuits comprise, first, two parallel channels, the one of which 29 is direct, and the other 30 introducing a delay of $2\theta$. The mixed outputs of these two channels, thus deliver a coded train, unrectified or uncorrected, multiplied by 5, as it results from the addition of the direct train and of a train of the same structure delayed by $2\theta$, thus multiplied by 4 with relation to the first train; after rectification or level correction, if desired, by a carry over operator 31, the train multiplied by 5 is then delayed by $\theta$ in delay line 32, which ensures the train being multiplied by 2; overall, the incoming train has effectively had its code multiplied by the value 10. The output of the delayed path 32 is applied to the input of the mixer 28 of the following stage of immediately lower order. Of course, the output of mixer $28^1$ comprises no multiplier circuit as the coding path which operates it through quadripole $22^1$ is related to the digits of the units.

Things being thus arranged and assuming a three digit decimal number to be converted, the digit of the hundreds is displayed in parallel binary numeration on quadripole $22^3$ by operating controller $26^3$, the digit of the tens on quadripole $22^2$ is displayed or registered by operating controller $26^2$, and the digit of the units on quadripole $22^1$ by operating controller $26^1$. The pulse for converting said parallel numeration into series numeration is applied onto inputs $33^3$, $33^2$ and $33^1$ of the quadripoles, in sequence, in the order of decreasing inputs. The pulse applied at $33^3$ causes the generation of a coded train carrying the digit of the hundreds, which passes through the carry over operator $28^3$, after which it is multiplied by ten, in its carried over value, before being applied onto carry over operator $28^2$. At this instant is applied onto input $33^2$, the reading pulse of quadripole $22^2$ digit of the tens, both coded trains, the one from 32 which carries the digit of the hundreds multiplied by 10 and the one supplied from $27^2$ carrying the digit of the tens, mixing into the carry over operator $28^2$. The rectified or level-corrected addition train which issues from this operator is in turn multiplied by ten, thus carrying the digits of the hundreds and of the tens to their respective orders, and the digit of units is added in carry over operator $28^1$, due to the fact that, at the instant at which the above-cited train reaches this operator, the latter is also reached by the coded train of the units, generated by the reading pulse of quadripole $22^1$, and adding both trains within carry over operator $28^1$ thus gives the series binary numeration registration of the decimal number, the digits of which were displayed on the quadripoles.

Since the delay times of all adding and multiplying portions 23—32 of the circuit are identical and known (the carry-over operators may either impose no delay or have a delay time $\theta$, according to requirements), it is an easy matter to determine the correct instants at which the code-reading impulses must be applied to the respective quadripoles. This may be done in one of two ways. The first way is, as assumed in the foregoing description of the operation of the converter, to arrange for the code-reading impulses to be applied to the different quadripoles at time intervals equal to the delay time of each portion 23—32 of the circuit, for example by choosing appropriate ones of the series of timing or synchronising impulses to be used as code-reading impulses, or, if there is no convenient source of such timing or synchronising impulses, then by tapping off a code-reading impulse from appropriately spaced sections of an auxiliary delay line provided for that purpose. The other way is to apply a code-reading impulse simultaneously to all quadripoles 22, but to provide in the output conductors 27 thereof delay lines designed to ensure that the digit trains resulting from such application of the code-reading impulses do not reach the carry-over operator 28 until the correct instant when the train from the preceding quadripole arrives at that point.

Instead of using a channel of partial totalizers, as just described, the invention also provides, more advantageously with reference to the bulk of the circuits, for associating to a quadripole for displaying the decimal digits in parallel binary numeration, a totalizer circuit with loop memory. Such an arrangement is diagrammatically shown in Fig. 3.

In this figure, the memory totalizer comprises an addition circuit 34, incorporating a carry over operator, the output of which is brought back through a delaying line 35, terminated on its characteristic impedance 36, if desired (particularly where a regenerator stage is used at the output of the line), this line 35 has a transit time equal to the duration of the train carrying the maximum numerical quantity to be dealt with. The output of line 35 may be brought bask to the input by two different paths, only one of which is operating at any instant, the shifting from one path to the other being performed under the control of a double throw switch 37. Path 38 is direct, whereas the other path comprises a circuit for multiplying by ten the code number which passes through it. In the drawing the multiplying circuit is shown in the form of a delaying line 39 having three sections each with an individual transit time $\theta$, the output of which is simultaneously made at the second and fourth taps, which effectively gives the desired multiplication by ten. At 40 is shown the characteristic impedance termination of line 39 and at 41 an elementary carry over operator, enabling to simplify the corresponding circuit in totalizer 34.

Consequently, if reverse contact 37 is located in direct path 38, the train supplied from line 35 is re-injected into totalizer 34, to regenerate its pulses as to shape, amplitude and duration, which ensures the substaining of the inscription. If contact 37 is connected to the output of path 39—41, the train re-injected into totalizer 34 will have its code multiplied by 10, this second position must be taken by contact 37 prior to insertion into the totalizer of a coded train carrying the digit of the next lower order in decimal numeration, or preferably while this insertion is performed, both operations being possibly simultaneous and the multiplication being controlled by the insertion.

This insertion is obtained, for each digit, by connecting the corresponding quadripole 22 to a contact 42, the various contacts 42 being in parallel to the input of totalizer 34. It is self-evident that at each occurrence of a contact 42 being operated, contact 37, normally positioned in path 38, must be temporarily operated for connecting path 39—41 to the input of the totalizer during a time $N\theta$, if N corresponds to the maximum order which may have a coded train carrying the maximum value to be dealt with. It is moreover self-evident that one of the contacts 42 must be lowered or closed at the instant of reading of the quadripole to which it is connected. Thus practically it will be advantageous to accomplish the functions of contacts 42 and reverse contact 37 by electronic means, for controling them from one single reading pulse.

The entire registering converting operation is thus performed by displaying or registering on controllers 26 the various digits of the number to be converted, in decimal numeration, in the form of their registration in parallel binary numeration, then by applying in succession the reading pulses onto the quadripoles, starting with the highest decimal order and by inserting them at each occurrence into the totalizer in series registration, at each time an elementary coded train is sent into the totalizer; the loop of the latter is fed by reversing contact 37 through the path of multiplication by ten, in such a manner that, at this instant, the input mixing at totalizer 34 generates a coded train carrying the sum of the result of the previous totalization or totalizations multiplied by ten and of the introduced digit. At the end of the operation the final result may be picked-up as a whole, and if desired without cancellation, by closing output contact 43, which was, up to then, left open, if it was not desired to pick-up the partial results.

It may be seen that, as a modification of such a use of this converter, it is possible to proceed with the inscription onto the quadripole of the next higher order of the corresponding digit of the number to be converted, then to transmit it in series binary numeration onto the totalizer, even before inscribing the next following digit. Consequently, it becomes possible, then considering only the latter operational process, to provide only one single quadripole 22, with three sections, that is, with four output taps, for converting all the digits of a number. This ensures a real economy both in material and bulk, the capacity of a converter thus depending only upon the capacity of the totalizer, and more precisely of the delaying line 35 of said totalizer.

Figs. 4 and 5 show two embodiments of a converter of this latter type. However in these figures the totalizer has not been shown for simplification in the drawing, its structure being identical to that of the totalizer shown in Fig. 3.

On quadripole 22 of Fig. 4 the value of the digit of the highest decimal order of the number to be converted is inscribed or registered in binary numeration by means of controller 26, then contact 44 is closed (or contact 42, only one of these contacts being provided). The pulse from generator 45 generates, by reading of the quadripole, the train coded in binary numeration representing this digit, and sends it into totalizer 34 through lead 27. This train is thus recorded and circulates in the memory loop of the totalizer, its pulses being regenerated, and thus sustained. The operator then registers on the same quadripole 22 the value of the next following decimal digit and converts it into a coded binary train which is introduced into totalizer 34 at the same instant at which the recorded train, already there, presents its first instant in coincidence with the instant of this new train, as above explained, due to the timing of the reading pulse. Moreover when the operator closes contact 44 (or 42) he simultaneously operates reverse switch 37, thus the recorded train is multiplied by 10 prior to its mixing with the incoming train, as was the case in the diagram of Fig. 3. The new train, being level-connected, is sustained in the memory loop of the totalizer, which is thus ready for receiving the next succeeding decimal digit, and so on.

Instead of a controller such as 26, a precoding arrangement may be utilized, such as shown in Fig. 5 by providing all binary code combinations of digits from 0 to 9 permanently formed by resistance mixers connected to the four taps 23. Through thus established sets of resistors 46, the nine output leads are connected to nine contacts 42, from (1) to (9) made available to the operator and operated simultaneously with reverse switch 37. However, a tenth contact 42 (0) is additionally made available to the operator, to enable him to simply close reverse switch 37 if he wants to introduce digit 0 at any decimal order.

Fig. 6 shows another modification in which, starting from the device for constituting decimal digit codes such as those shown in Fig. 4 or in Fig. 5, for instance, the coded trains successively generated are not immediately sent into the totalizing memory loop, but are inscribed, one following another, in an intermediate memory for storage until the totalizing memory is available.

For such purpose, lead 27 is connected to one of the control grids of tube 47, on a second grid of which the sustaining pulse are applied, as shown at 48. The output of tube 47 is connected through lead 49 to the delaying line 50 of this intermediate memory loop the output of line 50 being brought back through the right-hand contact of reverse switch 52 and resistance 53 to the control grid of tube 47 for sustaining the pulse. The transit time of line 50 is N$\theta$, N being an integral multiple of 4, if this number N is used to denote the maximum number of instants of all coded trains at four instants successively and individually inscribed, one following another, in this intermediate memory.

For the successive introduction of these coded digit trains, an auxiliary arrangement is provided, consisting in an additional portion of line 50, at 51 with transit time 4$\theta$ and the signals picked-up at the end of this portion 51 may be applied onto tube 47 when reverse switch 52 is set to its left-hand contact. This switch is automatically operated each time the operator, by actuating either contact 44 or 42, causes the generation of a coded train of decimal digits, so that at the instant at which said train reaches the input grid of tube 47, the previously recorded train is delayed by 4$\theta$. Consequently, the new introduced train will locate itself in the memory loop at 4$\theta$ in advance to the train previously registered in said memory loop. This operation of reverse switch 52 being repeated at each introduction, the sequence of the previously recorded trains is progressively shifted by 4$\theta$ at each operation, and thus the trains are given their correct location in the intermediate memory loop 47—50.

Of course, it must be noted that the left-hand position of reverse switch 52 must be maintained, not during 4$\theta$, but during N$\theta$, which is the total time capacity of the intermediate memory. Moreover, resistor 53 is provided of such value (if desired unidirectional) that the pulses entering lead 27 cannot enter line 50.

The sequence of the conversions into series binary numeration of the various decimal digits being thus inscribed or registered and sustained in the intermediate memory loop, the picking-up for totalization in totalizer memory loops 34—41 may be set forth as follows:

If T is the duration N$\theta$, reverse switch 52 is brought to its left-hand position during a full 4T duration, while at the beginning of each period T switch 55 is closed during 4$\theta$. Consequently at each start of a period T a coded train of decimal digits will be introduced into the totalizer memory by totalizer 34 and, of course, also each time reverse switch 37 changes its position at the same time as contact 55 is closed, thus ensuring in the above-cited manner, multiplication by ten of the code of the train resulting from the next preceding totalization. In practice, of course, reverse switches 52, 37 and switch 55 are set under the control of the program of the machine or of the system incorporating the converter thus formed, that is, the first pulses of the timing sequence, recurring at every T period, start the operations, reversing switches 37 and 52 and switch 55 being then closed again by pulses of a predetermined place in said timing pulse sequence at the above-cited period of times.

By way of example, such a circuit may be considered for translating decimal numbers comprising four digits: thousands, hundreds, tens, units. The thousands digit is first translated and inscribed in the intermediate memory. If A is the corresponding four instant train, the first instant of the train then coincides with the first instant of duration T, the insertion of the second digit converted, that is, the hundreds digit, shifts by 4$\theta$ the coded train of the thousands digit and, after inscription, is available in the loop 47—50, a mixed train in which the trains of the hundreds digits, be it B and of the thousands, be it A, the first instant of B being in coincidence with the first instant of period T. And so on, in such a manner that after inscription is ended, the thousands digit occupies the four last times $\theta$ of period T. At the time of transferring to the totalizer memory, a delay 4$\theta$ is reintroduced, which then brings back the first digit of the thousands to the four first instants of T, whence their transfer by contact 55 to totalizer 34. However, as the duration of the loop is maintained, by reverse switch 52, and extended by 4$\theta$ at the following move, the instants which present themselves at the first four times of period T are the instants of the hundreds digit, which therefore are transferred in totalizer 34, and so on.

The embodiment of the above set forth combinations of means necessitates only previously known technical arrangements, either generally, such as the timed opening or closing controls of electronic switches and reverse switches (which are frequently called "gates" in technical publications), or more particularly, as in previous patent application of the present applicant, for instance, as regards memory totalizers, in the copending patent application filed on July 19, 1950 for "Improvements in Electrical Pulse Transmission Circuits," now Patent 2,679,040. However to illustrate more fully this embodiment, the annexed Figure 7 shows a diagram of the electronic arrangement of a numeration converter according to the invention and according to the arrangement shown in Fig. 4 (in combination, a quadripole coder and a memory totalizer with multiplication by ten at each occurrence of the introduction of a coded train of decimal digit).

In said Figure 7 one finds again, at 22, the quadripole for coding in series binary numeration, any decimal digit displayed or registered by controller 26. Said coding is made effective by manually closing switch 44, but generator 45 applies only the reading pulse at the first time position of the above cited period T in the sequence of the timing pulses, in fact, 45 then denotes a pulse selector which at each period T picks up the said first pulse. At the same time as it causes the reading of quadripole 22, said pulse first is applied to a tripper or trigger stage comprising tubes 95—96 paired according to a known double stability tripper circuit, for instance, such as follows: the circuit comprises, from the grid of tube 95 to the plate of tube 96 an R-C network 97, from the grid of tube 96 to the plate of tube 95 an R-C network 98, the cathodes being connected in common through a bias resistance 99 to the two grids through bias resistances 100 and 101 respectively. The grid of tube 95 is connected through lead 92 to switch 44, and at the first pulse of the period T following the closing of switch 44 the tripper changes its equilibrium or stable position (the tube which was blocked becomes unblocked and the tube which was unblocked becomes blocked); however the tripper is brought back to its first stable condition by the last timing pulse of this period T, applied at 93 and delayed for instance by $\theta/2$ in delaying line section 94, and then applied to the grid of tube 96. This last control is repeated at each last pulse of any period T, because, if the trigger stage has not been operated, its stable condition is merely confirmed by the said last pulse.

This tripper serves as a controlling member for the connection of reverse switch 37, shown on the preceding figures and consisting here in the two tubes 85 and 87 respectively which are blocked and unblocked, alternately, by the voltages from the tripper stage, through leads 90 and 91 connected between the anodes of tubes 95 and 96 and the blocking electrodes of tubes 85 and 87. Tube 87 is controlled through the direct connection from the loop memory through resistor 89, to its control grid. The common anode outputs of both these tubes are brought back, through lead 59 serving to re-inject the coded trains to sustaining tube 60 of the totalizer memory, through resistor 62. This sustaining tube receives on a second grid at 61 the uninterrupted sequence of the timing pulses and its output is connected to input terminal 58 of the totalizer memory loop. At 88, on the one hand, and at 63, on the other hand, are shown power supply resistors for tubes 85—87 and 60—56.

Tube 56 is the input tube of the totalizer to the control grid of which lead 27 from coder 22 is connected. On a second grid, as shown at 57, there may be applied, if desired, the recurrent sequence of the timing pulses, for reshaping the pulses of the incoming train. This train must be added to the trains previously totalized in the memory. At 58 appear simultaneously two coded trains of pulses the maximum level of which is unity, one of said trains being supplied from the output of tube 56, the other train from the output of tube 60; mixing of these trains produces levels of double the unity value, thus requiring a level rectification or correction by carry over as by using a totalizer circuit with carry over operations as described in the above-cited application filed on July 19, 1950.

The result of the mixing performed at 58 is first applied onto the input of a delaying line 64, the total transmit time of which is $\theta$; however this transit time is obtained with one section of $\theta/4$ short circuited as shown at 65, followed by one section of $\theta/2$ between the input and output terminals of this line, terminated on its characteristic impedance 66. This arrangement effects the transformation of the unipolar pulses incoming at 57 into double polarity pulses, as set forth in the above-cited application, for maintaining the average level of the coded train and, moreover, it causes the application to tube 70 of pulses the polarity of which is the reverse of those of the incoming train. Tube 70 is so arranged, for instance by its cathode bias, that it is only responsive to levels of double the unity value but not to unity amplitude levels of the pulses applied to its input grid through resistor 72. Each time said tube 70 detects a double unity level, it applies to point 58, through anode output resistor 73, a unity level pulse of the same polarity as the incoming pulses. As this pulse is delayed an amount $\theta$ by the delay in line 64, the carry over operation is thus ensured. Additionally, tube 70 generates through anode output resistor 74 a double unity level pulse the polarity of which is, of course, the reverse to that of the pulses from line 64. The latter pulses having been transmitted, through series resistor 67 to the input of line 68 to which are also applied the double unity level pulses generated by tube 70 when excited. This leads to the fact, that, at this line input, any double unity level pulse from the output of line 64 is canceled by the reverse polarity pulse from tube 70 through resistor 74.

The level correction of the mixed train being thus performed, said train flows through line 68 the delay of which is such that, with the delay $\theta$ of line 64 in series, the overall delay is equal to $N\theta$, N being the maximum number of the instants of the train representing the largest numerical value to be dealt with (train of maximum order N−1). Line 68 is terminated on its characteristic impedance 69 and its output acts, as described, on tube 87. With condition of simple sustaining of the memory, this tube 87 is unblocked by the bias from the tripper and, consequently, the inscribed train is again applied through lead 59 onto sustaining tube 60.

However, at the introduction of a new digit, tube 87 is blocked by the condition change of the tripper and tube 85 is unblocked, as the output of line 68 is also permanently connected to the auxiliary channel for multiplying the code by ten, this operation is then performed before the train is applied again onto sustaining tube 60 at the output of tube 85. This multiplication channel comprises, for instance, a delaying line 39 terminated on its characteristic impedance 40, the output taps of which are so chosen that they effect the multiplication by five of the carried code, by mixing of the direct train and of the same train delayed an amount $2\theta$, that is, multiplied by 4. As this mixing again produces double unity levels, this delay line is followed by a carry over operator with an input delaying line having a delay $\theta$, which means that at the same time at which it effects the desired level correction, the carry over operator multiplies the result of the first mixing by 2, whence the desired multiplication by 10. Its structure being similar to the input carry over operator of the totalizer, it comprises a delaying line 75, one end of which, $\theta/4$ distant from the input, being short-circuited as shown at 76, and the line being terminated at its other end on the characteristic impedance 77. The output of line 75 is connected in parallel to input resistors 78 of the double unity level detector (tube 79, the cathode of which, for instance, is biased at 80) and resistor 83 feeding to input resistor 84 of tubes 85. Plate resistors 81 and 82 of tube 79 have respectively the same functions as resistors 73 and 74 of the input carry over operator of the memory.

Tube 43 connected to the plate lead of the sustaining tube 60 serves to pick-up the coded train in series binary numeration in the totalizing memory of the converter thus constituted. This tube 43 has been shown as provided with a second grid which is excited, when pick-up is desired, by unblocking pulses applied at 43*a* (which may advantageously consist in the above-cited timing pulses), in such a manner that the coded pulse train resulting from the complete numeration conversion appears onto lead 43*b*. For cancelling a record, it is sufficient to prevent the sustaining pulses from reaching tube 60. It is to be noted that, should it be desirable to ensure the cancelling while re-introducing the first digit of a following recording, and while performing a last pick-up of the number thus recorded, the input of tube 43 must be from lead 59.

It must be well understood that many modifications of the arrangements set forth above may be used within the scope of the invention as defined in the following claims.

What I claim is:

1. A method of electrically converting a number in a first numeration system into a number of another numeration system of an order inferior to said first numeration system, comprising the steps of registering each digit of the number expressed in said first numeration system in the form of a code expressed in the said other numeration system, producing a coded electric impulse train for each digit in said number, each train representing in the other numeration system the corresponding digit in the first numeration system, adding said coded trains together and, before said adding operation, converting said coded trains into coded trains representing in the said other numeration system the product of their digits multiplied by the value of the radix of said first numeration system raised to the power corresponding to the respective digits, thus producing a resultant train coded to represent the number expressed in the base of said other numeration system.

2. A system for electrically converting a number in a first numeration system into a number of another numeration system of an order inferior to said first numeration system, comprising, registering means for registering each digit of the number expressed in said first numeration system in the form of a code of the said digit expressed in the said other numeration system, reading means for reading said registered code and producing a coded electric impulse train for each digit in said number, each train representing in the other numeration system the corresponding digit in the first numeration system, means for converting said coded trains into coded converted trains representing in the said other numeration system the product of their digits multiplied by the value of the radix of said first numeration system raised to the power corresponding to the respective digits, and totalizing means for adding said coded trains and said converted trains, thereby producing a resultant train of pulses coded to represent the number expressed in the base of said other numeration system.

3. A system according to claim 2 wherein said registering means comprises as many quadripoles as there are digits in the number to be converted, and said totalizing means includes means for effecting level-correction of the totalizing operation by a carry-over operation, and said reading means comprises means to read said quadripoles in succession.

4. A system according to claim 2 wherein said registering means includes one quadripole for each digit of a number to be converted, the outlet channels of said quadripoles being connected in common to said totalizing means, and said totalizing means includes means for effecting level-correction of the totalizing operation by a carry-over operation, and said reading means comprises means to read said quadripoles in succession.

5. A system according to claim 2 wherein said registering means comprises a single quadripole on which the digits of the number to be converted are registered in succession, and including a memory loop interposed between said quadripole and said totalizer, said memory loop including means for multiplying each new digit code supplied by said quadripole by the first numeration order of the previous code train.

6. A system according to claim 2 wherein said registering means comprises as many quadripoles as there are digits in the number to be converted, and a progressive totalizing channel connects the output of each quadripole to said totalizing means, each channel including means to multiply by ten the result of the preceding partial totalizing operation.

7. A system according to claim 2 wherein said registering means comprises at least one multipole, and including cams for operating the output switches of said multipole from a common operator to close different combinations of said switches in different positions of said operator.

8. A system according to claim 2 wherein said registering means comprises a single quadripole on which the digits of the number to be converted are registered in succession, and including a memory loop totalizer interposed between said totalizing means and said quadripole, the output of said quadripole being connected to the inlet of said memory loop, said loop having two reinjection channels, one comprising a direct channel and the other including a multiplier, a switch for alternately completing said channels, and means controlled simultaneously with the operation of said switch for operating said reading means.

9. A system according to claim 2, and including a source of timing impulses recurring in periodic cycles each of a plurality of pulses, and control means responsive to the first impulse in each cycle for effecting operation of said reading means.

10. A system according to claim 9 wherein said registering means comprises a multipole, and said control means applies the first impulse of each cycle to the input of said multipole.

11. A system according to claim 2 wherein said registering means comprises a single quadripole on which the digits of the number to be converted are registered in succession, and including a memory loop interposed between said totalizing means and said quadripole, said memory loop including means to progressively distribute the pulse trains transmitted from said quadripole in a period of time equal to the maximum time required for the transmission of any number.

References Cited in the file of this patent

UNITED STATES PATENTS

| | | |
|---|---|---|
| 2,318,591 | Couffignal | May 11, 1943 |
| 2,403,873 | Mumma | July 9, 1946 |
| 2,429,228 | Herbst | Oct. 21, 1947 |
| 2,570,220 | Earp | Oct. 9, 1951 |
| 2,657,856 | Edwards | Nov. 3, 1953 |